United States Patent [19]

Marx et al.

[11] 4,442,157

[45] Apr. 10, 1984

[54] FIREPROOFING COMPOSITION AND DOOR RABBET COATED THEREWITH

[75] Inventors: Hans-Norbert Marx, Buehl-Weitenung; Reimer Göttsche, Baden-Baden, both of Fed. Rep. of Germany

[73] Assignee: BASF Aktiengesellschaft, Fed. Rep. of Germany

[21] Appl. No.: 220,964

[22] Filed: Dec. 29, 1980

Related U.S. Application Data

[63] Continuation of Ser. No. 12,722, Feb. 16, 1979, abandoned.

[30] Foreign Application Priority Data

Feb. 23, 1978 [DE] Fed. Rep. of Germany ....... 2807697

[51] Int. Cl.$^3$ .......................... B32B 3/00; C09D 5/18; C09K 3/28
[52] U.S. Cl. ..................................... 428/173; 252/602; 252/606; 252/607; 428/500; 428/921; 521/907; 523/179
[58] Field of Search ................ 521/907; 252/602, 606, 252/607; 523/179; 428/500, 921, 173

[56] References Cited

U.S. PATENT DOCUMENTS

| | | | |
|---|---|---|---|
| 2,452,054 | 10/1948 | Jones et al. | 252/607 X |
| 2,594,937 | 4/1952 | Lauring | 252/607 X |
| 3,513,114 | 5/1970 | Hahn et al. | 252/606 X |
| 3,925,137 | 12/1975 | Kamei | 252/607 X |

FOREIGN PATENT DOCUMENTS 1061011 7/1959 Fed. Rep. of Germany ...... 252/606

*Primary Examiner*—Richard D. Lovering
*Attorney, Agent, or Firm*—Keil & Witherspoon

[57] ABSTRACT

Heat-foamable fireproofing compositions contain thermosetting phenolic resins, thermally decomposable organic nitrogen compounds, eg. dicyandiamide, an ammonium salt and a carbohydrate or polyhydric alcohol, and on decomposition form a stiff carbonaceous foam.

3 Claims, No Drawings

FIREPROOFING COMPOSITION AND DOOR RABBET COATED THEREWITH

This application is a continuation of U.S. Ser. No. 012,722, filed Feb. 16, 1979, now abandoned.

Fireproofing agents which are intended for brushing onto, or impregnation of combustible materials, such as wood, cellulose fiberboard, paper, cardboard or the like, or of non-combustible materials, such as metal, plaster or the like, and which exert a protective action at the temperature of the flames, have long been known. It is also known to use, for this purpose, mixtures which consist of resins, starch or glue and foam-forming materials, such as phosphate salts, boric acid or the like. Mixtures of the latter type which contain from 50 to 80% of foam-forming substances, for example ammonium phosphate, from 10 to 50% of a urea-formaldehyde resin, in which, when forming the resin, the formaldehyde may be entirely or partially replaced by a formaldehyde donor, eg. hexamethylenetetramine, and from 3 to 50% of carbohydrates or glue, have proved particularly advantageous. Such mixtures may be employed in powder form, or suspended, partially dissolved or completely dissolved in liquids, such as water. In a flame, such fireproofing agents form a firmly coherent, porous, carbonaceous foam, which is an excellent heat insulator.

Such coating agents are described, for example, in the following patents and patent applications:

German Pat. No. 962,824, German Published Application DAS No. 1,061,011, German Pat. No. 1,065,116, and German Laid-Open Applications DOS No. 1,644,780, DOS No. 1,794,343 and DOS No. 2,200,104.

It is also known to convert such coating agents to thicker strips, for example by applying the agent, in the form of a paste, to a glass fiber fabric or fleece, drying the material and cutting it into strips. When glued into grooves in door leaves, they seal the rabbet of the door by foaming in the event of a fire. This method of protection is described, for example, in Wood Treatment 1975/18, page 3; in many countries, providing doors and closable connecting hatches between different rooms with such fireproofing strips is legally prescribed.

There has been a tendency to replace the protective strips by pastes which can be spread directly in the rabbet grooves. The available compositions which can be processed as pastes suffer from the fact that, unlike strips, they do not contain any reinforcing structures (fabrics or the like) and hence are preferentially formulated so that in the dry condition they possess mechanical strength (for example in order not to crumble when the door is slammed).

In aiming at such formulations, the ability of the strips to froth up in the event of a fire, which ability must of course be much more pronounced than in the case of finishing compositions, is neglected.

Whilst finishes, when exposed to heat, in most cases only foam to form 5 to 10 times the volume of the composition not exposed to heat, fireproofing strips must have an initially small cross-section (for example 0.5 cm$^2$) but must, in the event of a fire, foam to fill the entire door rabbet, which frequently fits badly. For this, expansion ratios (cf., in this context, German Published Application DAS No. 1,061,011) of more than 10 are absolutely essential. The resulting carbonaceous foam should be sufficiently stable mechanically to develop additional forces holding the frame and the door together. It is an object of the present invention to provide fireproofing compositions which may be applied to door rabbets as pastes and which, after drying, have adequate mechanical strength and in the event of fire foam to more than 10 times their original volume.

We have found that this and other objects are achieved if the conventional aminoplasts (ie. condensates of urea, melamine, dicyandiamide and the like with formaldehyde or other aldehydes), which have hitherto been employed extensively as base materials for such pasts or coating agents, are replaced by a phenol-formaldehyde or other phenol-aldehyde resin (minor amounts of aminoplasts can of course also be present) and if, furthermore, a combination of certain other substances is used. Hence, the invention in particular relates to a heat-foamable fireproofing composition which forms an insulating layer, is preferentially used to secure door rabbets to prevent the passage of flames in the event of a fire, and contains an effective amount of each of the following:

(a) a phenolic resin, which may be thermosetting by itself or upon addition of an aldehyde donor, (b) an ammonium salt, (c) a carbohydrate and/or a polyhydric alcohol and (d) a thermally decomposable organic nitrogen compound, with or without (e) a binder from the group comprising the water-soluble, solvent-soluble and water-dispersible vinyl polymers, and with or without (f) water and/or an organic solvent in an amount such that the constituents (a) to (e) remain substantially solid and form a spreadable, putty-like or flowable mass.

The term "effective amount", as used above, means that the omission or reduction of this amount results in a marked deterioration in the expandability of the composition in respect of volume and/or of stability of the resulting foam.

Suitable phenolic resins for the purposes of the invention include both resins which are not thermosetting by themselves, ie. which have been produced by acid condensation using a molar ratio of aldehyde to phenol of less than about 1, and to which an aldehyde donor, for example urotropine or paraformaldehyde, is added in order to render them thermosetting, and self-curing resins, ie. resols, in which the molar ratio is greater than 1. The proportion of the phenolic resin in the solid composition is, for example from 15 to 40% by weight (ie. from 15 to 40 parts by weight per 100 parts of expandable composition).

Examples of ammonium salts are those conventionally used for the production of expandable compositions, especially the phosphates; ammonium polyphosphates, as described in German Laid-Open Applications DOS No. 1,567,674 and DOS No. 1,794,343, are preferred. Their proportion in the solids content of the expandable composition is in general from 25 to 45% by weight.

The carbohydrates or polyhydric alcohols employed are the sugars conventionally employed industrially in expandable compositions, eg. sucrose, lactose and arabinose, as well as tetrahydric, pentahydric and hexahydric alcohols, eg. sorbitol, pentaerythritol, mannitol and their oligomers, eg. dipentaerythritol. Their function, in such compositions, is, in the event of a fire, to produce large amounts of loose carbon which can easily foam to form voluminous structures. Of course, mixtures of the above substances can be used. The use of pentaerythritol and dipentaerythritol is preferred. The proportion of the carbohydrates and/or polyhydric alcohols in the solids content of the composition according to the invention is in general from about 10 to 20% by weight.

The thermally decomposable organic nitrogen compounds used are especially compounds of the type of urea, melamine or dicyandiamide, ie. compounds which contain nitrogen in the form of amide groups. Together with other constituents of the mixture, they are capable of forming large amounts of gases. They may be employed either in the pure form or in resinous form, ie. as aminoplasts, but the former is preferred, since in the latter case they may interact with the phenolic resin used. Their proportion in the solids content of the compositions is in general from 15 to 40% by weight.

The binders used, if any, are soluble or at least dispersible vinyl polymers, which in most cases are film-forming, and the proportion of which is in general kept low. This proportion is usually from 1 to 10% by weight, and the material is preferably introduced in the form of a solution or dispersion in water and/or an organic solvent into the composition which in the first instance has to be worked to a spreadable or putty-like consistency, as is shown in the Examples. If a phenolic resin which is partially dissolved by the solvent system present is employed, the use of the above binders may in certain cases be unnecessary.

The binder may be of various types; both water-soluble systems, such as polyvinyl alcohol, polyacrylic acid or corresponding copolymers, and dispersible polymers, such as homopolymers and copolymers of vinyl acetate, vinyl propionate, acrylic esters, styrene, vinyl chloride and acrylonitrile, may be used.

The proportion of water or solvent is only significant in respect of the processing of the compositions and is determined by the requirement that the composition shall be spreadable, putty-like or flowable. As a rule, less than 50% by weight (based on the total composition, ie. including water and solvent), and in most cases less than 30% by weight, suffices.

The compositions according to the invention can furthermore contain, in overall minor amounts, constituents which do not form part of the invention, for example dyes, pigments, swelling agents, wetting agents, dispersants, fungicides, bactericides, extenders, eg. wood flour, fibrous materials, eg. glass fibers, asbestos or textile fibers, metal powders and halohydrocarbons.

To produce the compositions according to the invention, the solid constituents can first be milled, premixed dry and, if necessary, re-milled as a mixture, or can simply, be mixed intimately by directly milling them together. Water or solvent may also be added directly to facilitate processing. Examples of suitable mixing vessels are ball mills, kneaders or roll mills, and as a rule existing equipment proves suitable.

It is also possible in the first instance to produce powders only, which can be marketed in sacks or other powder containers, and which are brought to a putty-like or spreadable form by the processor. The invention is not restricted to the composition being in a spreadable form, particularly since the compositions are also suitable for knife-coating into fabrics or nonwovens which after drying, as mentioned at the outset, can be cut into strips which can be glued onto surfaces. Another possible way of using the compositions is to surface-treat preferably non-combustible granular carriers, eg. perlite or expanded mica (vermiculite), which gives granular compositions which can be used to fill ducts, passages in walls, cavities in insulating walls or doors, and the like.

1. Base mixtures

EXAMPLE 1

| | |
|---|---|
| 25 parts by weight of (1) | 100% strength phenolic resin, solid, thermosetting, as sold under the trade name Phenodur PR 373 by Hoechst AG, Germany |
| 33 parts by weight of (2) | ammonium polyphosphate |
| 24 parts by weight of (3) | dicyandiamide |
| 18 parts by weight of (4) | pentaerythritol |
| 100 parts by weight | |

EXAMPLE 2

The composition corresponds to Example 1 but instead of ammonium polyphosphate (2), an equal amount of monoammonium phosphate is used.

EXAMPLE 3

The composition corresponds to Example 1 but instead of dicyandiamide (3), an equal amount of melamine is used.

Within this framework, not only one component at a time, as in the preceding Examples, but also several components simultaneously, can be replaced by other components of their particular category.

2. Mixtures to be added for making-up

| Mixture A | |
|---|---|
| 90 parts by weight of | water |
| 10 parts by weight of | water-soluble, low-viscosity polyvinyl alcohol |
| 100 parts by weight | |

| Mixture B | |
|---|---|
| 80 parts by weight of | water |
| 10 parts by weight of | solvent(+) |
| 10 parts by weight of | water-soluble, low-viscosity polyvinyl alcohol |
| 100 parts by weight | |

(+)Ethanol, methyl ethyl ketone, ethylglycol, ethyl acetate or any similar solvent which, when used by itself, would act as a good solvent for the phenolic resin used.

If desired, the mixtures added for making-up can contain a polymer dispersion in place of from 3 to 10 parts by weight of water; for example, a suitable dispersion is a 50% strength aqueous dispersion of vinyl propionate.

Mixture C 100 parts by weight of a solvent mixture of equal parts of ethanol, methyl ethyl ketone, ethylglycol and ethyl acetate.

In each case, 100 parts by weight of the mixture according to Example 1, 2 or 3 are pasted with from 30 to 50 parts by weight of mixture A, B or C. To assess their technological characteristics, the pastes are rubbed into flat grooves of cross-section 2.5×10 mm, which have been milled into the broad face of softwood slats having a cross-section of 20×70 mm. The pastes dry relatively rapidly (depending on the water or solvent content) to give solid compositions.

As a demonstration, 200 mm long pieces of the dried slats are foamed in a test oven, preheated to 450° C., in the course of 3 (up to 5) minutes, giving the following results:

| Mixture | | Foam height | Foam structure |
|---|---|---|---|
| (1) Base mixture of Example 1 | 70% | =8 cm(x) | fine-pored/firm |
| Making-up mixture A | 30% | | |
| (2) Base mixture of Example 1 | 70% | −8 cm(x) | fine-pored/firm |
| Making-up mixture B | 30% | | |
| (3) Base mixture of Example 2 | 65% | 7 cm | fine-pored/firm |
| Making-up mixture A | 35% | | |
| (4) Base mixture of Example 2 | 70% | =8 cm(x) | fine-pored/firm |
| Making-up mixture B | 30% | | |
| (5) Base mixture of Example 3 | 70% | 7 cm | fine-pored/firm |
| Making-up mixture A | 30% | | |
| (6) Base mixture of Example 1 | 70% | =8 cm(x) | fine-pored/very firm |
| Making-up mixture C | | | |
| (7) Commercial product 1 | | 0.5–1 cm | coarse-pored/slightly firm |
| (8) Commercial product 2 | | 0.5–1 cm | fine-pored/soft |
| (9) Commercial ready-to-use strip, glued in | | 3.0–5 cm | fine-pored/moderately soft |

(x)in these experiments the foam height in each case reached the top of the muffle oven, which was 8 cm above the original surface of the slat.

EXAMPLE 4

230 parts by weight of expanded mica of particle size 2 to 3 mm, 680 parts by weight of the base mixture according to Example 1, 50 parts by weight of polyvinyl alcohol and 220 parts by weight of water are mixed together. Some of the water (180 parts by weight) is removed from the resultant wet granules by drying. The superficially dry granules can then be used for filling up a cable shaft. They are non-corrosive and do not release any substances. On heating, the granules expand to form an extremely voluminous porous mass.

EXAMPLE 5

230 parts by weight of expanded mica of particle size 3 to 5 mm and 950 parts by weight of the fireproofing paste obtained by mixing the base mixture of Example 2 with mixture B are granulated in a coating drum. The granules are dried and can then be used as specified in Example 4.

We claim:

1. A mechanically stable fireproofing composition which is heat-formable to more than 10 times its original volume to form a mechanically stable insulating layer and which consists essentially of
   (a) from 15 to 40% by weight of a phenolic resin, which is thermosetting by itself,
   (b) from 25 to 45% by weight of an ammonium salt,
   (c) from 10 to 20% by weight of a carbohydrate and/or a polyhydric alcohol,
   (d) from 15 to 40% of a thermally decomposable organic nitrogen compound, selected from the group consisting of urea, melamine, and dicyandiamide, and
   (e) from 1 to 10% of a binder from the group consisting of the water-soluble, solvent-soluble and water-dispersible vinyl polymers, the percentages given being based on the solids content of the composition.

2. The composition of claim 1 wherein water, an organic solvent or a combination thereof is included in an amount such that the constituents (a) to (e) remain substantially solid and form a spreadable or putty-like mass.

3. A door rabbet having thereon a coating of mechanically stable fireproofing composition as recited in claim 1, which is heat-foamable to at least 10 times its original volume, and which has sufficient mechanical strength to remain whole when the door is slammed, to prevent passage of flames in the event of a fire.

* * * * *